(12) United States Patent
Valerio

(10) Patent No.: US 12,053,844 B2
(45) Date of Patent: Aug. 6, 2024

(54) WELDING MANIPULATOR

(71) Applicant: MITUSA, Inc., Huntington Park, CA (US)

(72) Inventor: Leonel Valerio, Anaheim, CA (US)

( * ) Notice: Subject to any disclaimer, the term of this patent is extended or adjusted under 35 U.S.C. 154(b) by 717 days.

(21) Appl. No.: 17/186,316

(22) Filed: Feb. 26, 2021

(65) Prior Publication Data

US 2022/0274214 A1 Sep. 1, 2022

(51) Int. Cl.
B23K 37/02 (2006.01)
B25J 9/00 (2006.01)
B25J 11/00 (2006.01)

(52) U.S. Cl.
CPC ......... B23K 37/0211 (2013.01); B25J 9/0009 (2013.01); B25J 11/005 (2013.01)

(58) Field of Classification Search
CPC ........... B23K 37/0211; B23K 37/0282; B23K 13/01; B23K 37/0229; B23K 1/002; B23K 3/0475; B23K 1/0012; B23K 1/012; B23K 3/08; B23K 37/0461; B23K 9/287; B23K 37/02; B23K 37/00; B23K 37/047; B25J 9/0009; B25J 11/005; B25J 19/0004
USPC ................................ 219/125.1, 124.1, 130.1
See application file for complete search history.

(56) References Cited

U.S. PATENT DOCUMENTS

| | | |
|---|---|---|
| 2,495,438 A | 1/1950 | Bentley et al. |
| 2,909,394 A | 10/1959 | Wuesthoff |
| 3,031,566 A * | 4/1962 | Wuesthoff .......... B23K 37/0229 219/60 R |
| 3,472,342 A | 10/1969 | Wuesthoff |
| 4,500,065 A * | 2/1985 | Hennekes ............. B25J 19/063 901/41 |
| 4,530,456 A | 7/1985 | Michelotti |
| 4,691,905 A | 9/1987 | Tamura et al. |
| 6,305,678 B1 * | 10/2001 | Hammersmith ..... B23K 37/047 269/73 |
| 8,231,045 B2 | 7/2012 | Lagerkvist |
| 8,448,835 B2 | 5/2013 | Larsson |
| 9,033,205 B2 | 5/2015 | Castillo et al. |
| 9,604,331 B2 | 3/2017 | Noma et al. |
| 9,662,785 B2 | 5/2017 | Schultz |
| 10,369,668 B2 | 8/2019 | Jack et al. |
| 10,486,262 B2 | 11/2019 | Avila |
| 2006/0182557 A1 | 8/2006 | Frauen et al. |

(Continued)

FOREIGN PATENT DOCUMENTS

EP 2259895 B1 12/2010

*Primary Examiner* — Phuong T Nguyen
(74) *Attorney, Agent, or Firm* — McConnell Law Firm P.C.; Robert McConnell

(57) ABSTRACT

A welding manipulator for holding a welding head comprised of a base, rotating column and swivel boom is shown. The column includes a novel rotating apparatus comprised of a lockable rotary bearing, rotary housing, clamp shell and brake handle. In the unlocked position, the column rotates smoothly and easily around the base. In the locked position, the clamp shell engages and disengages the rotary bearing, thus locking the column in place.

The present welding manipulator also discloses a boom attached to the column with a swivel mount. This swivel mount allows the boom to be locked into an operating position or a shipping position for more compact shipping or storage. The disclosed welding manipulator also includes tracks on the column and a motorized screw drive to vertically position the boom.

11 Claims, 9 Drawing Sheets

(56) References Cited

U.S. PATENT DOCUMENTS

| | | | |
|---|---|---|---|
| 2008/0106020 A1* | 5/2008 | Sherlock | B23K 37/0452 |
| | | | 269/81 |
| 2011/0036898 A1* | 2/2011 | Lagerkvist | B23K 37/0235 |
| | | | 228/45 |
| 2011/0163151 A1* | 7/2011 | Larsson | B25J 9/023 |
| | | | 228/45 |
| 2012/0248082 A1 | 10/2012 | O'Connell | |
| 2015/0360313 A1* | 12/2015 | Andersen | B23K 37/0205 |
| | | | 219/130.1 |
| 2019/0009365 A1* | 1/2019 | Leicht | B23K 26/142 |
| 2019/0329365 A1* | 10/2019 | Simon | B23K 37/0282 |

\* cited by examiner

WELDING MANIPULATOR

FIELD OF THE INVENTION

The present invention relates to the field of welding and industrial equipment designed for mounting and positioning of welding equipment. Welding equipment produces intense heat that is used to fuse two pieces of metal together. This intense heat can be produced using many methods including chemical, electrical, a laser, an electron beam, friction, and ultrasound. This intense heat and the large scale of items to be welded often requires welding equipment to be operated by human beings at a distance using machinery to hold the welding equipment.

In many cases, the materials welded together are massive in size, weight and scale. The welding equipment to weld such materials together is often extremely large and heavy, but also requires precision location of the welding head in relation to the materials to be welded. Many devices have been developed to position welding equipment such as welding heads, including various welding manipulators similar to the present invention. A welding manipulator is simply a device for holding a welding head or apparatus that can move along a boom. The boom is connected to a column, which is connected to a base. The base secures the device to the shop floor and can be a large/stable piece of metal/concrete, connected to tracks or wheels for easy movement or secured to a shop floor for stability.

Typically booms can move vertically up and down the length column and welding heads move up and down the length of the boom. Some booms have adjustable angles to allow for more variation in positioning of the welding head. The height of the manipulator column in conjunction with the horizontal width of the boom, require significant space for shipment and/or storage of the manipulator. Additionally, typical manipulator columns are fixed in rotation.

BACKGROUND OF THE INVENTION

The present invention aims to address the shipment and storage problem of welding manipulators by introducing a swivel mount for the boom. The swivel mount has two positions, operating and shipping. In the operating position, the boom is securely locked in a position for welding, with the boom effectively perpendicular to the column. In the shipping position, the boom is folded parallel to the column, significantly reducing the amount of space needed for shipping or storing such a device. This can effectively reduce the amount of square footage required on a shop floor for a manipulator of the present invention, resulting in a substantial cost saving over time.

The present invention also includes a rotating and locking column. This column is positioned over a rotary bearing to allow the column to smoothly and easily rotate when unlocked. A clamp shell securely locks the rotary bearing when in the locked position enabling secure and precision welding.

BACKGROUND ART

The prior art patents in this technical field disclose a number of configurations of welding manipulators with bases, columns and booms. None of the prior art patents reviewed disclose the unique combination of a swivel boom and lockable rotating column. Other prior art patents describe some form of movable boom but do not disclose a swivel boom for more compact shipment and storage. No other patents in the art disclose the high strength, smooth operating rotary bearing with lock as disclosed in the present patent.

OBJECTS OF THE INVENTION

It is an object of the invention to provide a welding manipulator for mounting and positioning a welding head.

It is an object of the invention to provide a welding manipulator with a base, column and boom.

It is an object of the invention to provide a welding manipulator with a boom attached to the column with a swivel mount.

It is an object of the invention to provide a welding manipulator with a boom and swivel mount where the swivel mount has two positions, operating and shipping.

It is an object of the invention to provide a welding manipulator with a boom that is vertically positioned by a motorized screw drive.

It is an object of the invention to provide a welding manipulator with a rotating column.

It is an object of the invention to provide a welding manipulator where the rotating column rotates by use of a rotary bearing, rotary bearing housing and a clamp shell.

It is an object of the invention to provide a welding manipulator where the rotating column has a locked position and an unlocked position.

It is an object of the invention to provide a welding manipulator manufactured out of a variety of high strength materials.

It is an object of the invention to provide a welding manipulator that supports a variety of welding head technologies.

SUMMARY OF THE INVENTION

A welding manipulator comprised of a base, column and boom are disclosed. The column includes a novel rotating apparatus comprised of a lockable rotary bearing, rotary housing, clamp shell and brake handle. In the unlocked position, the column rotates smoothly and easily around the base. In the locked position, the clamp shell engages and disengages the rotary bearing, thus locking the column in place.

The present welding manipulator also discloses a boom attached to the column with a swivel mount. This swivel mount allows the boom to be locked into an operating position or a shipping position for more compact shipping or storage. The disclosed welding manipulator also includes tracks on the column and a motorized screw drive to vertically position the boom.

DETAILED DESCRIPTION OF THE INVENTION

The following detailed description outlines the preferred embodiment of the claimed invention. There may be many other configurations that comport with the attached claim language and this description is in no way limiting to the scope of the invention.

The present invention relates to devices for mounting and maneuvering welding equipment, specifically welding manipulators. Industrial welding equipment can be quite heavy, generates substantial heat and requires precision control to produce quality welds. Welding manipulators allow a human operator to operate heavy industrial welding equipment with required precision, protected from the heat generated and in confined/tight areas. For purposes of this patent application, a manipulator is defined as a device for locating a welding head that comprised of at least a vertical column and horizontally oriented boom. The boom is mounted crosswise, to the column such that it is able to travel vertically up and down the length of the column. A welding device is mounted on the boom and can travel up and down the length of the boom to perform welding operations. While welding manipulators are well known in the art, the present invention is characterized by two novel innovations: 1) the boom of the present invention is also able swivel or rotate up to 180 degrees such that the boom can be folded flush with the column and 2) the column of the present invention is rotatable, with a rotation locking mechanism to stop rotation.

Figure 1:
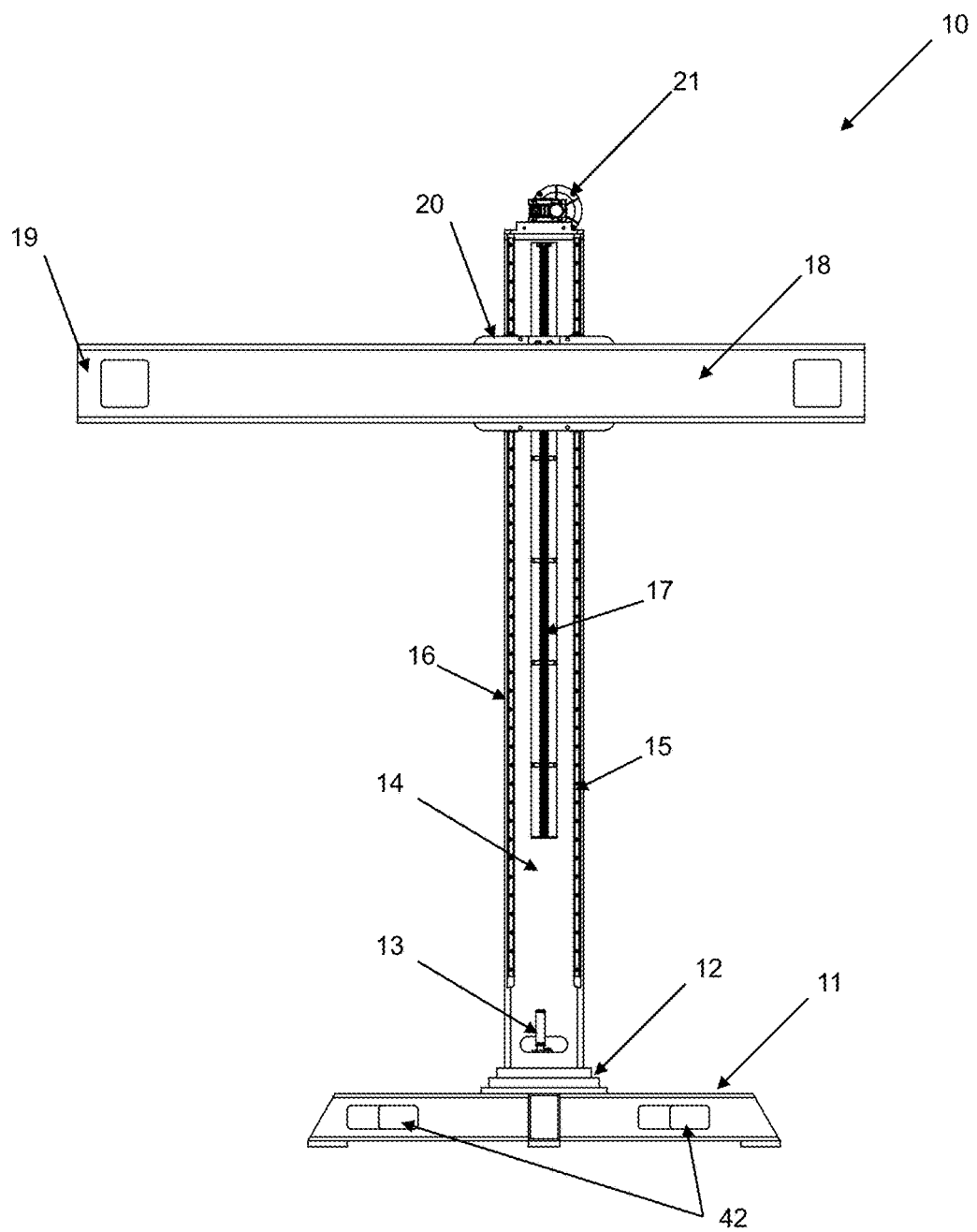
FIG. 1 shows a view of the complete welding manipulator without a welding head.

FIG. 1 shows a side view of the welding manipulator 10 comprising boom 18, column 14 and base 11. Base 11 provides stability to the manipulator unit on the shop floor or ground. Base 11 comprises two base arms with feet at each end. The base arms are attached perpendicularly to provide maximum for base 11. The base 11 can be mounted to the shop floor using bolts, tracks or other mounting methods well known in the art. Base 11 also includes base pockets 42. Base pockets 42 are formed in each arm of the base and are shaped to accept the forks of a forklift. The forklift forks can be placed through base pockets 42 so that welding manipulator can be lifted off the ground by a forklift for easy lifting and movement around a manufacturing area. Column 14 extends vertically from the base and attaches to the base at the rotary apparatus 12. Rotary apparatus 12, when unlocked, allows the column to freely rotate a full 360 degrees. Brake handle 13 controls the rotation lock. When locked, the column is locked in its position and rotary apparatus 12 cannot rotate. When unlocked, the rotary bearing can rotate freely and the column can rotate 360 degrees around it's axis. Rotary apparatus 12 is described in further detail in FIG. 3.

In the preferred embodiment, column 14 further includes first track 15 and second track 16. Boom 18 engages with first track 15 and second track 16 enable boom 18 to smoothly travel vertically along the column. Drive screw 17 is a vertically disposed threaded screw that is installed in the center of column 14. Drive screw 17 engages with a complementary set of threads on boom 18. When drive screw 17 rotates, it causes the complementary set of threads on boom 18 to rotate and thus move boom 18 up or down based on the direction of rotation of drive screw 17. Drive motor 21 provides motive force for drive screw 17 in both the clockwise and counterclockwise directions. In the preferred embodiment, drive motor 21 is a direct current (DC) 1 horsepower 1800 RPM motor driving a 10:1 gear box. The horsepower rating varies from 1-2 horsepower depending on the manipulator size. While a DC motor is used in the preferred embodiment, any electric powered drive motor well known in the art could be suitable for use with the disclosed manipulator.

Welding manipulators well known in the art have a fixed boom that is installed effectively perpendicular to the vertical column. These prior art manipulators require significant transport and storage space due to the fixed nature of the boom. The volume of space required by a prior art manipulator is similar to the volume of a cylindrical column where the diameter of the column is the length of the boom and the height of the column is the height of the column. Volume of such a column can be calculated using the equation Volume=$\pi \times$(boom length/2)$^2 \times$(column height) where $\pi$=3.14159.

Figure 6:
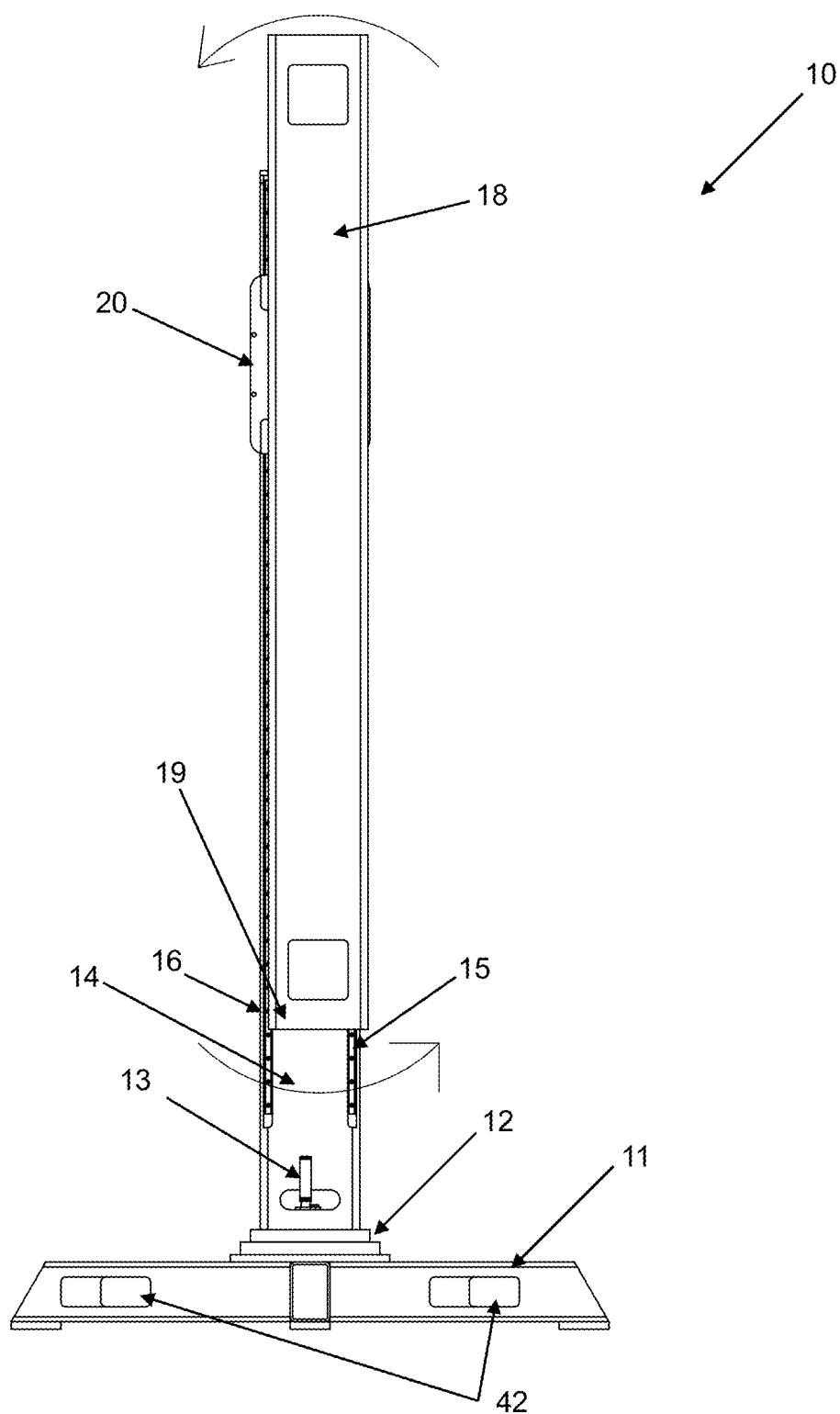
FIG. 6 shows the welding manipulator with the swivel mount in the shipping position.

In contrast to prior art manipulators, boom 18 has two positions, engaged as shown in FIG. 1 and swiveled (or folded) as in FIG. 6. This swivel boom significantly reduces the transportation and storage size required for this manipulator. Boom 18 is connected to column 14 by swivel mount 20. Swivel mount 20 allows boom 18 to swivel up to 180 degrees. In the swiveled position, boom 18 is parallel to the column and thus reducing the manipulator's overall footprint for easy storage and transportation. Welding mount 19 allows the mounting of many industry standard welding heads including Sub Arc, TIG or MIG. Welding mount 19 is positioned on linear bearing rails that allows the welding head to move along the length of the boom for welding head positioning. Welding head positioning can be done manually or with an optionally installed welding head electric motor. Boom 18 can be moved laterally along the x axis either by a crank or a motor. Lateral motion of boom 18 can be locked and unlocked by a brake apparatus installed on the boom.

In the preferred embodiment, column 14 is made of hot rolled steel tubing with a rectangular cross section with a cross sectional dimension ranging from 4"×10" to 8"×16" depending on the size of the manipulator. While hot rolled steel is used in the preferred embodiment, but a manipulator consistent with the attached claims could be manufactured out of any high strength material such as other forms of steel and aluminum. Boom 18 is also manufactured of hot rolled steel tubing with a rectangular cross section with a cross sectional dimension ranging from 4"×10" to 8"×16" depending on the size of the manipulator, but could also be produced in any high strength material such as other forms of steel and aluminum. Both column 14 and boom 18 are treated with vibratory stress relief. The preferred embodiment is anticipated to range in size from 2 feet by 2 feet to 14 feet by 14 feet in size.

Figure 2:
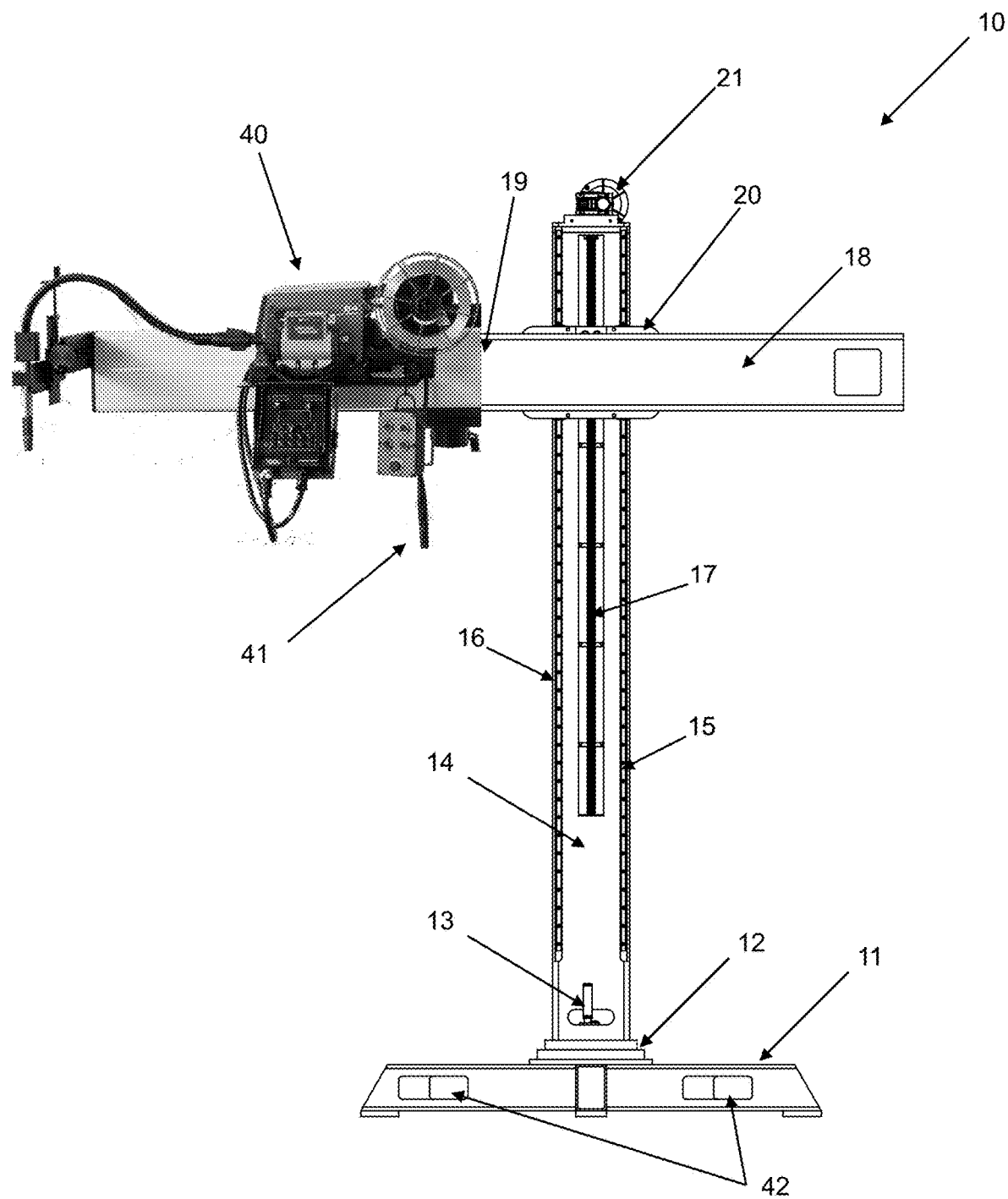
FIG. 2 shows a view of the complete welding manipulator with a welding head attached.

FIG. 2 shows the improved welding manipulator 10 with welding head 40 installed on welding mount 19. Welding head can be any industry standard welding head including Sub Arc, TIG or MIG. Welding head 40 is connected via power cord 41 to a welding unit for power supply and other relevant signals. Welding unit is not shown in the figure but is well known in the art.

Figure 3:
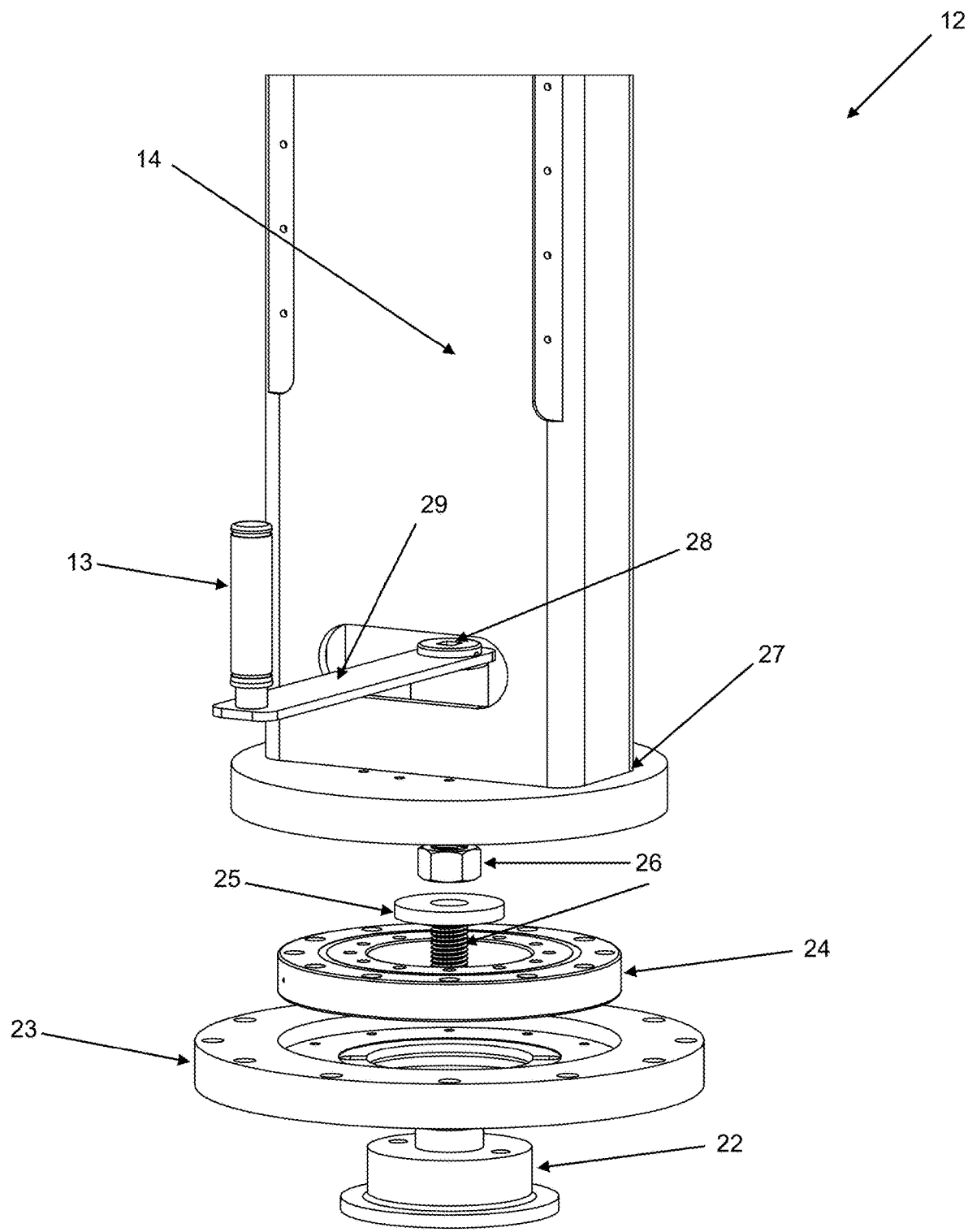
FIG. 3 shows an exploded view of the rotating apparatus at the base of the column.

FIG. 3 shows an expanded view of rotary apparatus 12. Column 14 is fixedly attached to rotary bearing cover 27 by welding, casting or molding. Rotary apparatus 12 rotates with the column when in the unlocked position and does not rotate when in the locked position. Brake handle 13 controls locking of rotary apparatus 12. Brake handle 13 is attached to brake lever 29 which in turn is connected to hex key 28. Hex key 28 fits around and rotates hex head bolt 26. In this figure, hex head bolt 26 is shown with the bolt head separated from the shaft with its threads, but in an assembled manipulator it is a single bolt with a head and a threaded shaft. Washer 25 fits over the threaded portion and shank of hex head bolt 26. The threaded end of hex head bolt 26 is threaded into complementary threads in the center of clamp shell 22. Horizontal rotation of brake handle 13 toward the locked position rotates hex head bolt 26 such that the threads of the bolt draw clamp shell 22 closer to the rotary bearing 24 while rotation of brake handle 13 toward the unlocked position rotates hex head bolt 26 such that clamp shell 22 is moved away from the rotary bearing 24. This movement locks and unlocks rotation of rotary bearing 24 respectively and is described in more detail below.

Hex head bolt 26 is a SAE Grade 8 bolt made of medium carbon alloy steel that has been quenched and tempered. The length, gauge and thread count of hex head bolt 26 depends on the size of the welding manipulator, i.e. smaller welding manipulators use smaller hex head bolts 26 and larger welding manipulators use larger hex head bolts 26 with lengths ranging from 1"-4" generally. The outer threads of hex head bolt 26 match the inner threads at the center of clamp shell 22 so that they rotate securely and the clamp shell 22 moves up and down the length of the hex head bolt 26 when the bolt rotates.

Rotary bearing 24 nests within bearing housing 23. Rotary bearing 24 and rotary bearing housing 23 are both made of a high strength and low friction material that allows the rotary bearing 24 to move freely and easily within bearing housing 23. Suitable materials include chrome steel, stainless steel, carbon alloy steel or ceramic. In the preferred embodiment, rotary bearing 24 and rotary bearing housing 23 are high rigidity with mounting holes type crossed roller bearing (CRBE) manufactured by HIWIN Technologies Corporation ranging in outer diameter from 210 mm to 380 mm. While this is the specification used in the preferred embodiment, any suitable rotary bearing 24 and rotary bearing housing 23 could be used manufactured in any suitable material such as chrome steel, stainless steel, carbon alloy steel or ceramic. When rotary bearing 24 is allowed to rotate without any force from above or below, it rotates very smoothly and easily within the bearing housing 23. Clamp shell 22 connects to hex head bolt 26 and is inserted through the center of rotary bearing 24 and rotary bearing housing 23.

When the user rotates brake handle 13 in the clockwise direction, hex head bolt 26 rotates clockwise causing the outer threads to move clockwise in the inner threads of clamp shell 22. This clockwise rotation causes clamp shell 22 to move vertically upward and exert force on the underside of the bearing housing 23. This motion causes the inner washer 25 and clamp shell 22 to be drawn together in a clamping motion against the rotary bearing 24 and bearing housing 23. This causes significant friction that creates a braking and locking function such that the rotary bearing 12 cannot rotate and the column is locked.

Alternatively, when brake handle 13 rotates in the counter-clockwise direction, hex head bolt 26 rotates counter-clockwise causing the outer threads to move counter-clockwise in the inner threads of clamp shell 22. This counter-clockwise rotation causes clamp shell 22 to move vertically downward and release force on the underside of the bearing housing 23. This motion removes the clamping force between the inner washer 25, rotary bearing 24, bearing housing 23 and clamp shell 22 thus allowing the rotary bearing 24 to rotate freely. Because the rotary bearing 24 can rotate freely, the attached column 14 and rotary bearing cover 27 can also rotate freely.

Figure 4:
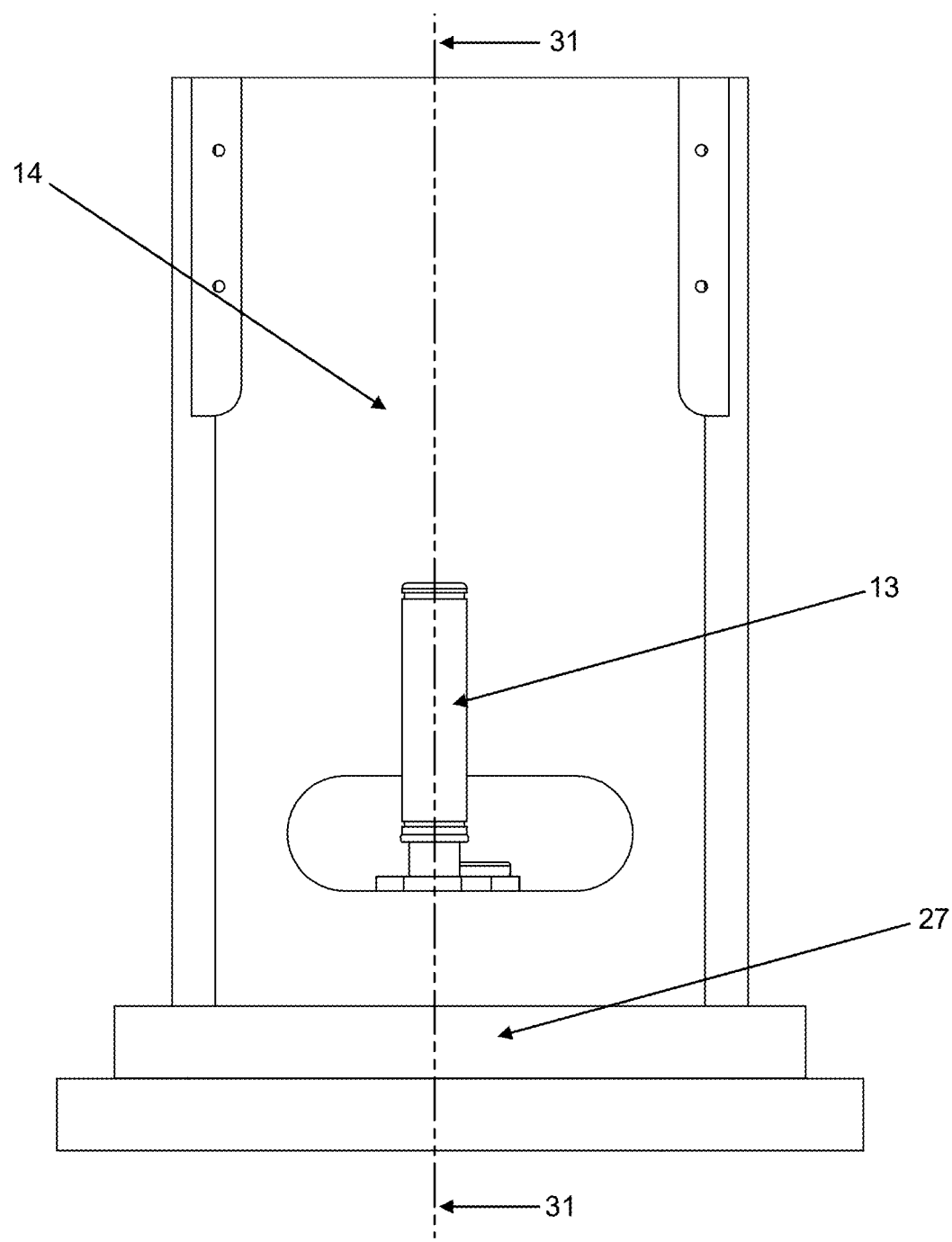
FIG. 4 shows side view of the base of the column including the brake handle.
Figure 5:
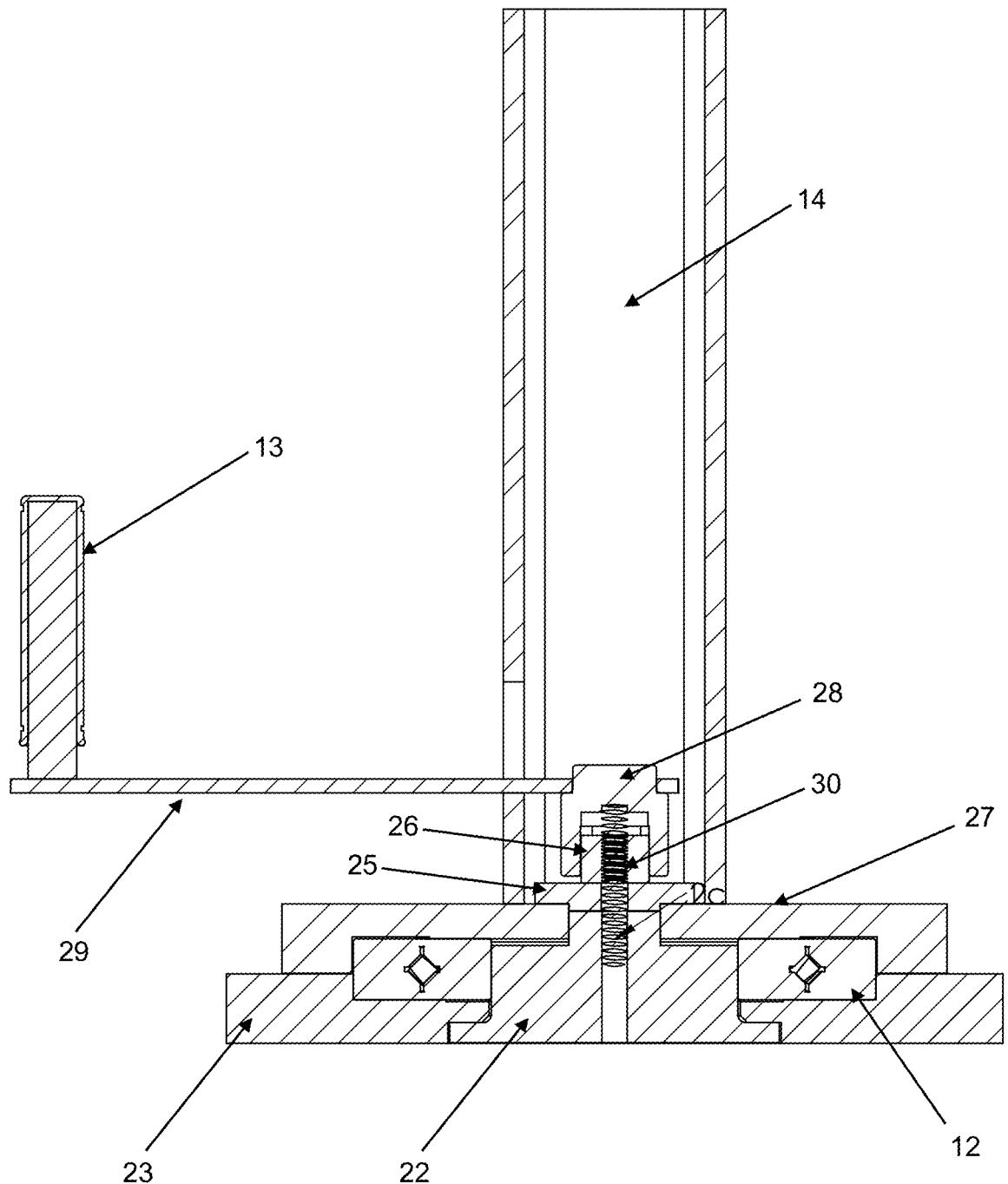
FIG. 5 shows cross section of the rotating apparatus at the base of the column.

FIG. 4 shows a side view of the welding manipulator column 14, brake handle 13 and rotary bearing cover 27 bisected by vertical line 31. FIG. 5 shows the cross section view of FIG. 4 as bisected by vertical line 31. Column 14 extends vertically over rotary bearing cover 27 which covers the internal portions of rotary bearing 24. As previously described, column 14 is fixedly attached to rotary bearing cover 27 by welding, casting, molding or other suitable high strength attachment methods. Brake handle 13 is attached to brake lever 29 which is further attached to hex nut 28. Hex nut 28 fits on top of hex head bolt 26. Inner washer 25 is placed over the threads of hex head bolt 26. The outer threads of hex head bolt 26 are threaded into the inner threads at the center of clamp shell 22. Rotary bearing 24 is nested within bearing housing 23.

When the user rotates brake handle 13 in the clockwise direction, hex head bolt 26 rotates clockwise causing the outer threads to move clockwise in the inner threads of clamp shell 22. This clockwise rotation causes clamp shell 22 to move vertically upward and exert force on the underside of the bearing housing 23. This motion causes the inner washer 25 and clamp shell 22 to be drawn together in a clamping motion against the rotary bearing 24 and bearing housing 23. This causes significant friction that creates a braking and locking function such that the rotary bearing 12 cannot rotate and the column is locked.

Alternatively, when brake handle 13 rotates in the counter-clockwise direction, hex head bolt 26 rotates counter-clockwise causing the outer threads to move counter-clockwise in the inner threads of clamp shell 22. This counter-clockwise rotation causes clamp shell 22 to move vertically downward and release force on the underside of the bearing housing 23. This motion removes the clamping force between the inner washer 25, rotary bearing 24, bearing housing 23 and clamp shell 22 thus allowing the rotary bearing 24 to rotate freely. Because the rotary bearing 24 can rotate freely, the attached column 14 and rotary bearing cover 27 can also rotate freely.

FIG. 6 shows welding manipulator with boom 18 in the folded position. Here, boom 18 is folded such that it is parallel with column 14. The remaining features of the welding manipulator such as base 11, rotary apparatus 12, brake handle 13, first track 15, second track 16 and welding head mount 19 remain the same. Boom 18 rotates around swivel mount 20, which is described in more detail in FIGS. 6, 7 and 8.

Figure 7:
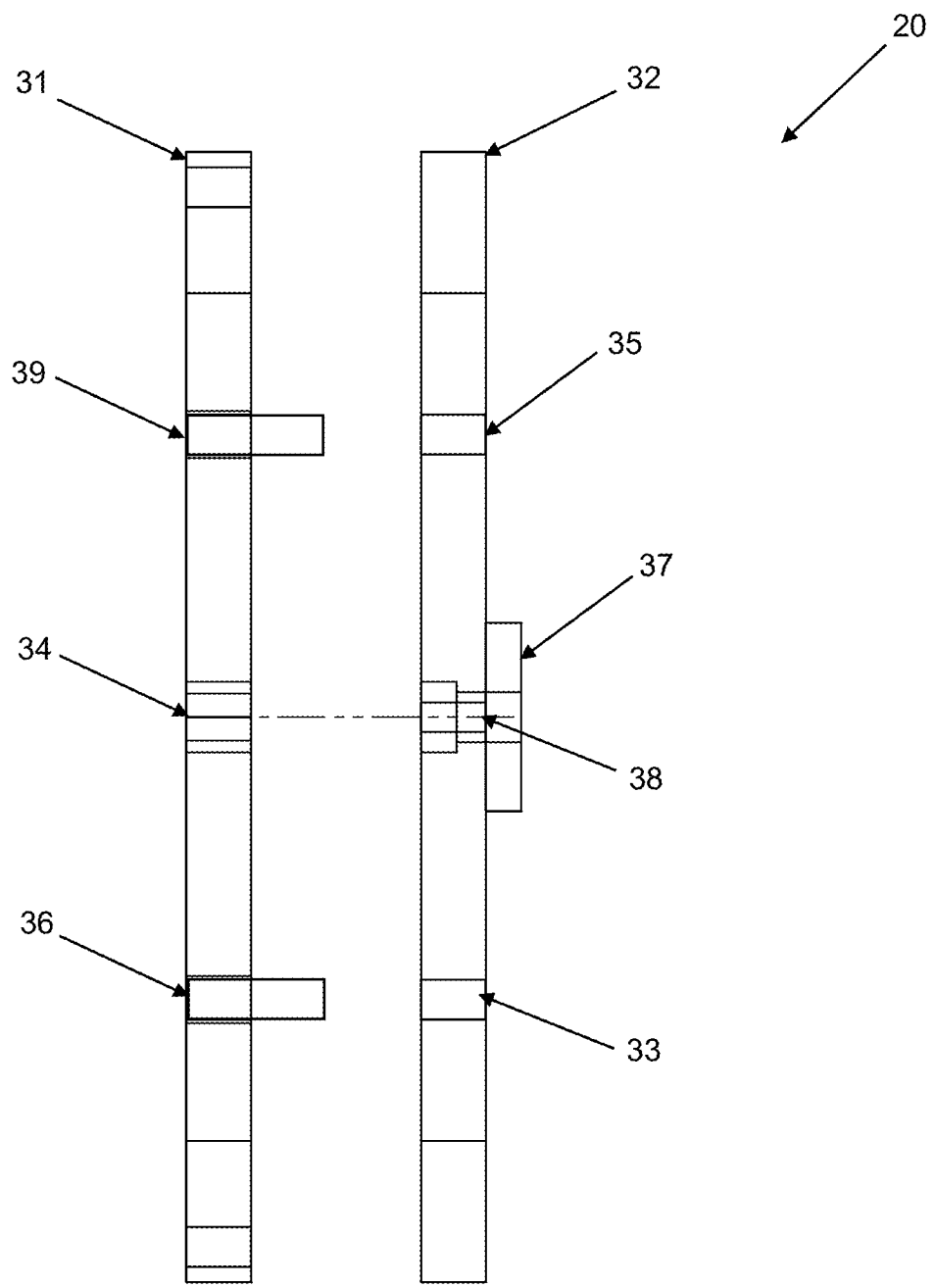
FIG. 7 shows an exploded view of the swivel mount.

FIG. 7 shows an exploded view of swivel mount 20 with additional detail. Swivel mount 20 is comprised of two metal plates, first plate 31 and second plate 32. First plate 31 and second plate 32 are made of the same material, in the preferred embodiment a high strength, durable and low friction material, specifically hot rolled and machined steel. Other materials could be used such as steel, aluminum, carbon steel, stainless steel or ceramic. First plate 31 and second plate 32 have matching central holes 38, through which a threaded screw runs and is secured by locking washer 37. First plate 31 has first pin 36 and second pin 36. Second plate 32 has first slot 33 and second slot 35. First pin 36 fits through first slot 33 and second pin 39 fits through second slot 35. In the preferred embodiment, shoulder screws are used for first pin 36 and second pin 39. The shoulder screw comprises a head at one end, a shaft in the center and threads at the second end. The shoulder screw of first pin 36 fits through first slot 33 with the threads connecting with complimentary threads formed in first plate 31. The shoulder screw is threaded into position and thus provides support and guidance for the swivel as it moves. Second pin 39 operates in the same manner as first pin 36. First pin 36 and second pin 39 provide support and guidance through first slot 33 and second slot 35. As the swivel mount 20, moves through its range of motion, first pin 36 and second pin 39 move through the length of first slot 33 and second slot 35. When the end of the range of motion is reached, each pin and the end of the slot act as a bump stop.

Figure 8:
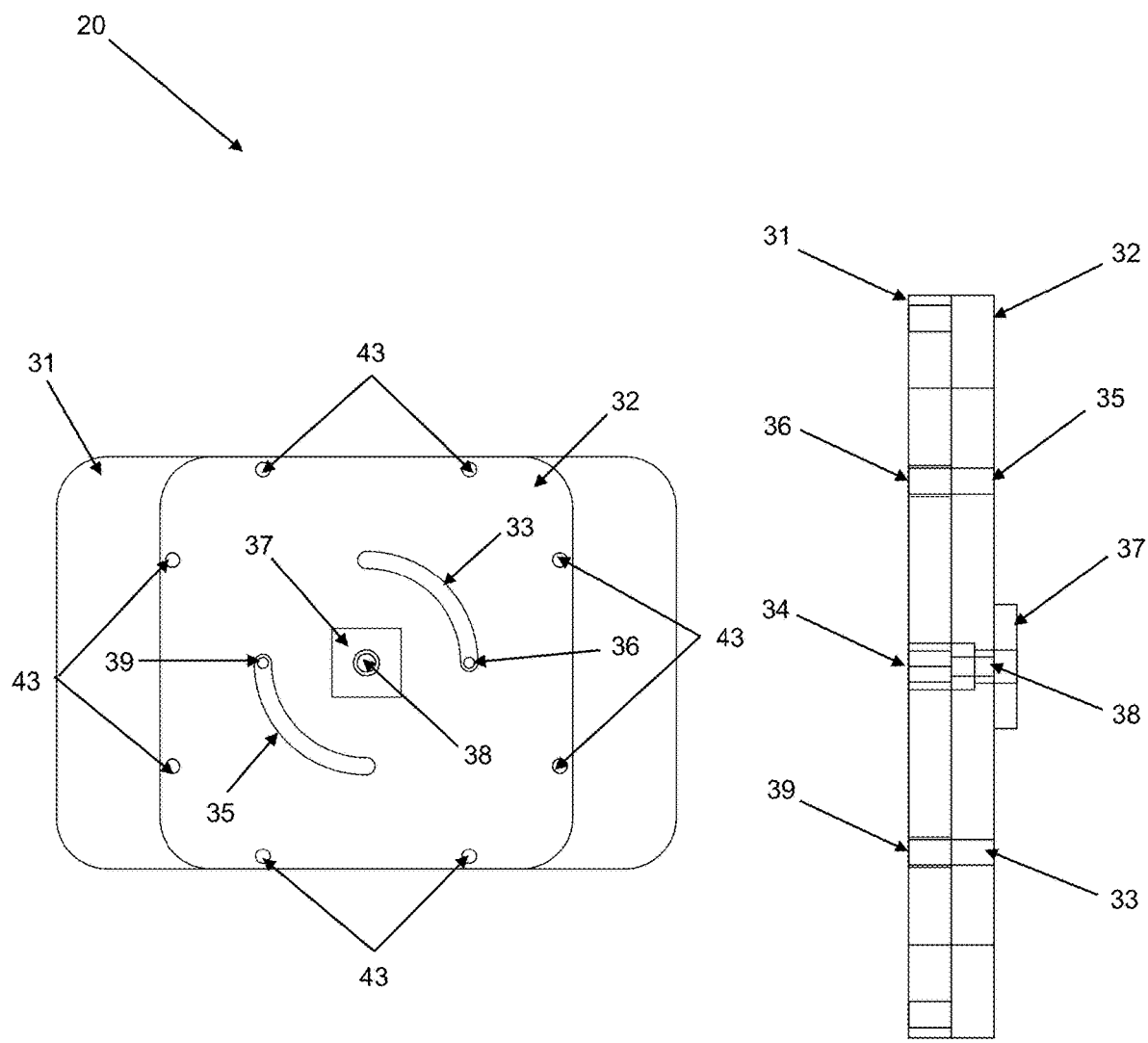
FIG. 8 shows the swivel mount in the operating position.

FIG. 8 shows swivel mount 20 in the working position with boom 18 in the extended position. Here, first pin 36 and second pin 39 are located at one end respectively of first slot 33 and second slot 35. As discussed above, first pin 36 and second pin 39 are shoulder screws in the preferred embodiment. Second plate 32 includes swivel lock holes 43 along each side of the plate. These swivel lock holes 43 accept the threaded end of a shoulder screw. When the shoulder screw is placed through swivel lock holes 43 it places pressure on the first plate 31 and thus locks the swivel mount 20 in the working position. Swivel mount 20 rotates around center nut 38 and locking washer 37.

Figure 9:
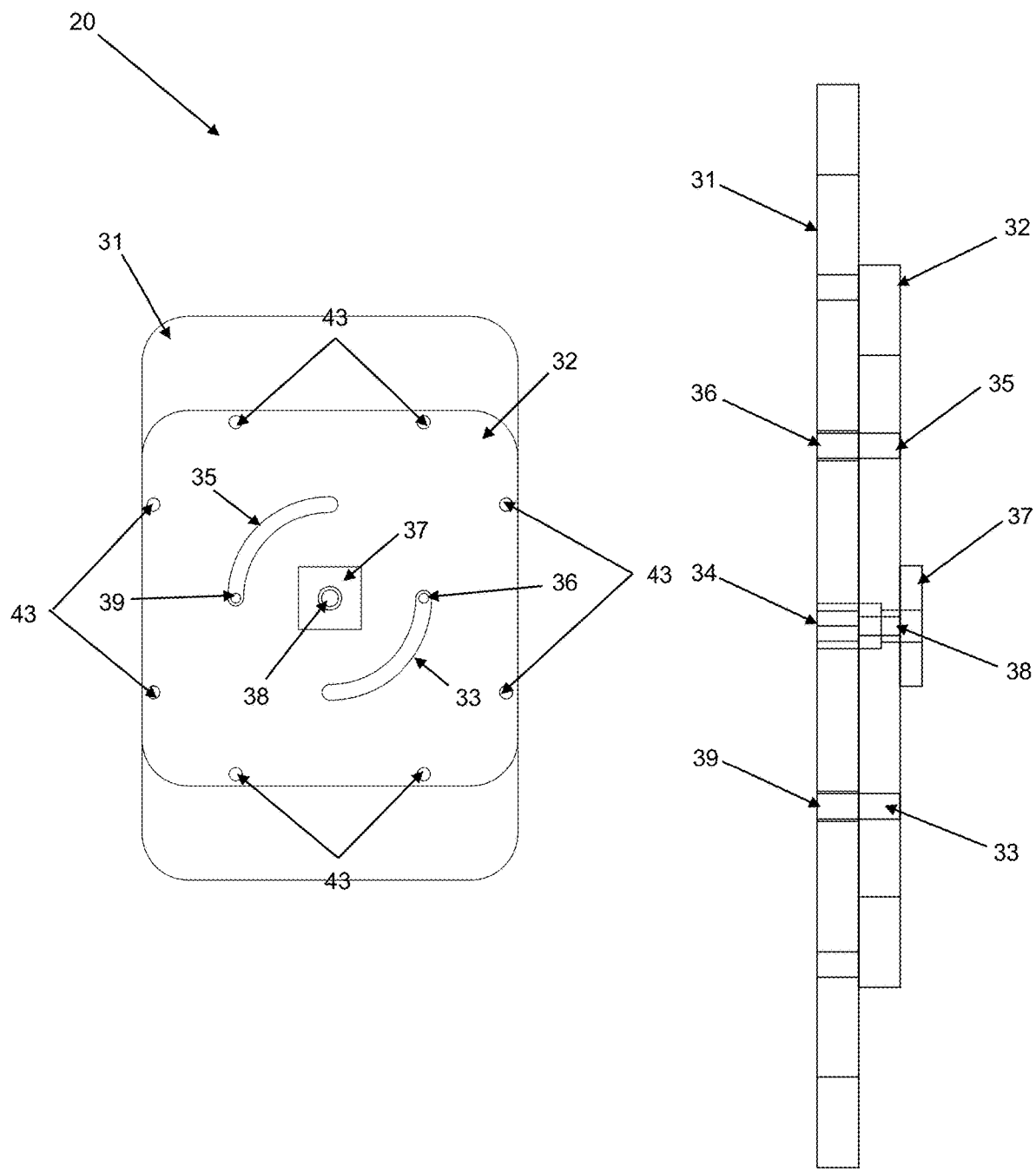
FIG. 9 shows the swivel mount in the shipping position.

FIG. 9 shows swivel mount 20 in the swivel/folded/shipping position. In this state, first pin 36 and second pin 39 are locked at the opposite end of first slot 33 and second slot 35. The swivel mount 20 is oriented such that the boom 18 would be parallel with the column and the first pin 36 and second pin 39 act as bump stops to lock the boom in this position for shipping. Swivel plate holes 43 on the opposite side of the swivel mount can be used, by inserting a shoulder screw, to lock the swivel mount 20 in the shipping position.

The present figures and detailed description disclose the preferred embodiment of the claimed invention and are not meant to limit the scope of the claims. Many other configurations and embodiments are possible within the scope of the present claims.

The invention claimed is:

1. An apparatus for positioning welding equipment comprising:
    a base;
    a column extending vertically from the base and attached to the base by a rotary apparatus such that the column rotates around its center axis on the rotary apparatus in relation to the base;
    a brake handle connected to the rotary apparatus having at least two positions, locked and unlocked, where when the brake handle is in the locked position, the rotary apparatus is prevented from rotating and where when the brake handle is in the unlocked position, the rotary apparatus rotates freely;
    a boom for supporting a welding head, the boom attached to the column by a swivel mount, where the swivel mount has at least two positions, operating and shipping, where when the swivel mount is in the operating position, the boom is locked in a position where the welding head is positioned along the boom for welding operation and when the swivel mount is in the shipping position the entire boom is locked in a position that is parallel to the column.

2. The apparatus for positioning welding equipment of claim 1, where the rotary apparatus comprises:
    a rotary bearing cover attached to the base of the column;
    the brake handle connected to a brake lever with two ends with the brake handle at the first end and a hex key at the second end, said brake handle having at least a first locked position and a second unlocked position;
    the hex key positioned to couple with a bolt, the bolt comprising a head at a first end, and a shaft with outer threads positioned at a second end, and move the bolt in either a first direction or a second direction based on the first position or second position of the brake handle;
    an inner washer with a center hole positioned over the shaft of the bolt;
    a rotary bearing having a center rotary bearing hole located at the center of the rotary bearing, the shaft of the bolt being positioned through the center rotary bearing hole;
    a rotary bearing housing with an upper side, a lower side and circular indention for housing the rotary bearing, the rotary bearing housing further comprising a center rotary bearing housing hole, the shaft of the bolt positioned through the center rotary bearing housing hole; and
    a clamp shell with a center clamp shell mounting hole, the center clamp shell mounting hole having inner threads disposed to couple with the outer threads of the second end of the bolt,
    where the clamp shell is oriented to engage the rotary bearing cover and prevent the rotary apparatus from rotating when the brake handle is in the first locked position and where the clamp shell is oriented to disengage from the rotary bearing cover and allow the rotary apparatus to rotate when the brake handle is in the second locked position.

3. The apparatus for positioning welding equipment of claim 2, where the swivel mount further comprises;
    a first swivel plate with a first locating pin, second locating pin and a first swivel plate center hole;
    a second swivel plate with a first locating slot, a second locating slot, a second swivel plate center hole and at least one swivel lock hole; and
    a rod with external threads at a first end attached to the first swivel plate at its center and a second end positioned through the second swivel plate center hole, and further comprising a locking nut at the second end.

4. The apparatus for positioning welding equipment of claim 2, where the rotary bearing is comprised of chrome steel, stainless steel, ceramic or carbon steel.

5. The apparatus for positioning welding equipment of claim 2, where the first pin and second pin are shoulder screws.

6. The apparatus for positioning welding equipment of claim 1, where the base comprises openings sized to fit the forks of a forklift.

7. The apparatus for positioning welding equipment of claim 1, where the base, column and boom are comprised of hot rolled steel.

8. The apparatus for positing welding equipment of claim 1, where the welding head is a TIG welding head.

9. The apparatus for positing welding equipment of claim 1, where the welding head is a MIG welding head.

10. The apparatus for positing welding equipment of claim 1, where the welding head is a sub arc welding head.

11. The apparatus for positioning welding equipment of claim 1, further comprising:
    the column having first side with first track and a second side with a second track;
    a central screw drive positioned vertically through the center of the column;
    the central screw drive coupled to the boom such that when the screw drive rotates in a first direction, the boom travels vertically in a first direction and when the screw drive rotates in a second direction, the boom travels vertically in a second direction; and an electric motor coupled to the screw drive to rotate the screw drive in a first direction and a second direction.

\* \* \* \* \*